IMAGE STORAGE TUBE

Filed Sept. 19, 1962

INVENTOR.
MICHAEL F. TOOHIG
BY Percy P. Lantzy,
ATTORNEY.

United States Patent Office 3,243,643
Patented Mar. 29, 1966

3,243,643
IMAGE STORAGE TUBE

Michael F. Toohig, Fort Wayne, Ind., assignor to International Telephone and Telegraph Corporation, Nutley, N.J., a corporation of Maryland Filed Sept. 19, 1962, Ser. No. 224,782
2 Claims. (Cl. 315—12)

This invention relates generally to camera tubes which convert an optical image to an electrical signal, and more particularly to storage camera tubes.

Camera tubes fall in two general classifications, i.e., non-storage type and storage type, the most common non-storage type of camera tube being the image dissector. Since sensitivity is an important requirement in most camera tubes, a storage system is incorporated in the tube wherein an electron image corresponding to the input optical image is "written" into a storage element, and subsequently "readout." The image orthicon, which is the most common type of storage camera tube, utilizes as the storage element an imperforate continuous sheet or film of dielectric material having one side facing the photocathode. The photocathode emits an electron image responsive to the input optical image, the electron image impinging upon the dielectric film and producing a charge image thereon corresponding to the electron image. In order to read-out the stored charge image, an electron beam is scanned over the side of the dielectric film remote from the photocathode thereby to discharge the charge on the film. In such a tube, since the read-out is provided by capacitor discharge, the output signal characteristics (amplitude and resolution) are directly related to the scanning speed, and thus provision of a satisfactory signal output level has in the past required a relatively fixed scanning rate in a fabricated tube to maintain an output signal of constant characteristics.

There are applications for storage camera tubes wherein, in addition to high sensitivity, long storage, multiple non-destructive read-outs, and signal characteristics independent of scanning speed are desired.

It is accordingly an object of this invention to provide an improved storage camera tube.

Another object of the invention is the provision of an improved storage camera tube wherein non-destructive read-out is provided.

A further object of the invention is to provide an improved storage camera tube wherein the output signal characteristics are independent of scanning speed.

The objects of the invention are obtained by providing a storage element wherein the output signal is obtained by tranmission modulation of the scanning beam rather than by capacitor discharge. More particularly, in accordance with the invention there is provided in a camera tube a perforate storage screen comprising a fine mesh metal screen having dielectric material on the one side thereof facing the photocathode. Thus, a charge image corresponding to the electron image is developed on the dielectric material responsive to impingement of the electron image thereon. The other side of the metal screen is scanned by a low velocity electron beam and with proper potentials applied to the metal screen and the other tube elements, the charge pattern on the dielectric material controls or modulates the transmission of the reading beam electrons through the storage screen; a part of the reading beam electrons pass through the storage screen and the remainder are reflected back toward the electron gun, the ratio of transmitted to reflected electrons depending upon the incremental charge on the dielectric material in the area of approach of the electron beam to the storage screen. The output signal is taken from either the transmitted or the reflected part of the reading beam.

The above-mentioned and other features and objects of this invention and the manner of attaining them will become more apparent and the invention itself will be best understood by reference to the following description of an embodiment of the invention taken in conjunction with the accompanying drawings, wherein.

Figures 1, 2:
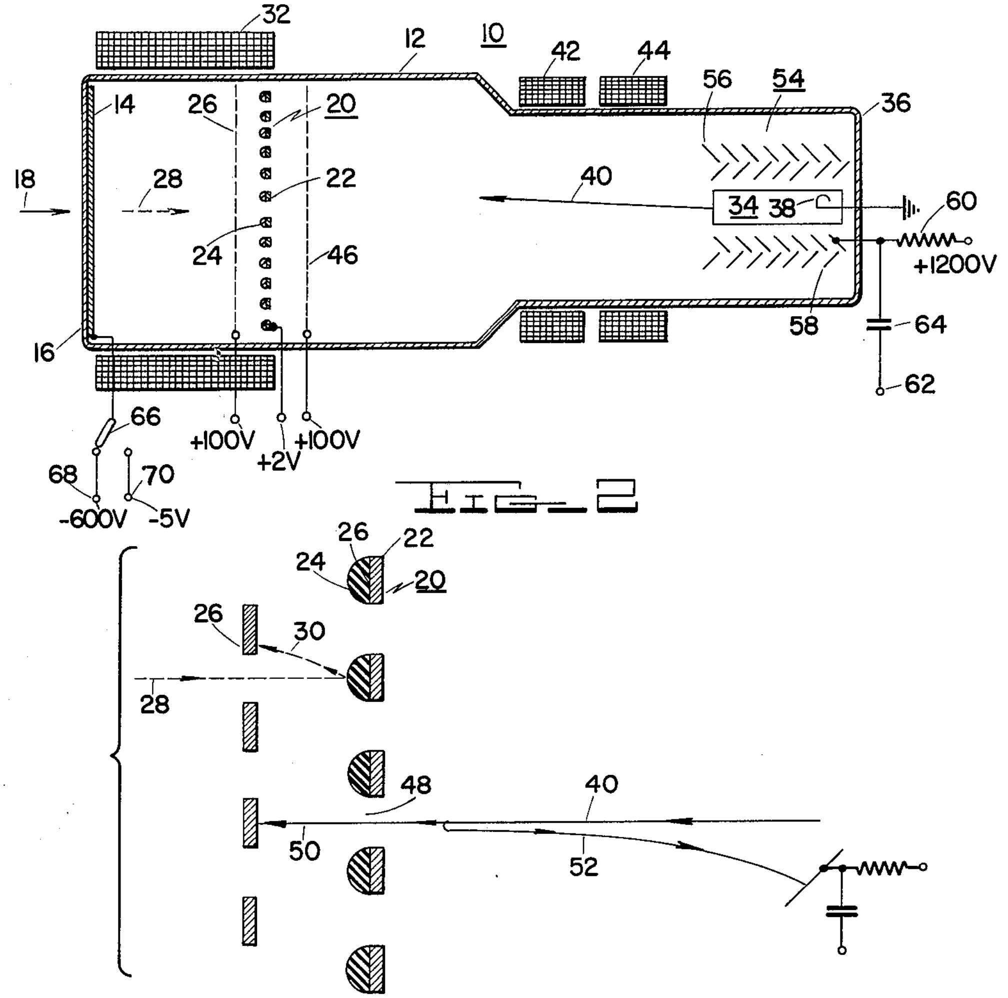
FIG. 1 is a schematic view of a storage camera tube incorporating the invention.
FIG. 2 is an enlarged diagrammatic view of the storage screen of FIG. 1 illustrating the mode of operation of the invention.

Referring to FIG. 1, there is shown a storage camera tube, generally indicated at 10, having an enclosing envelope 12. A conventional photocathode 14 is deposited upon the interior surface of end wall 16 of envelope 12 which is transparent to the frequency spectrum of the input radiation image, indicated by the arrow 18.

A storage screen assembly 20 extends transversely across envelope 12 spaced axially from photocathode 14. Storage screen assembly 20 comprises a fine mesh metal screen 22 having secondary-emissive dielectric material 24 deposited on screen 22 and facing photocathode 14.

A secondary electron collector electrode 26, shown here as being in the form of a metal screen, extends transversely across envelope 12 between the photocathode 14 and the dielectric material 24.

The photocathode 14, metal screen 22 and the collector electrode 26 are connected to suitable potentials so that the electron image produced by the photocathode 14 responsive to impingement of the input optical image 18 thereon is directed toward the storage screen 20 as shown by the arrow 28. Upon impingement of the electron image on the dielectric material 24, secondary electrons are emitted therefrom which are directed toward and generally collected by electrode 26, as shown by the arrows 30. This action produces incremental electrostatic changes on the surface of dielectric material 24 with respect to the metal screen 22 which vary in accordance with the electron image 18 thereby to provide across the area of dielectric material 24 a charge pattern or image corresponding to the electron image and in turn to the input optical image.

A conventional focusing coil 32 is provided surrounding the writing section of the envelope 12, i.e., between photocathode 14 and the storage screen assembly 20 in order properly to focus the electron image 28 onto the storage screen 20.

In order to read-out the charge image on the dielectric material 24, a conventional electron gun 34 is provided at the end 36 of the envelope 12 opposite from the photocathode 14. Electron gun 34 has a cathode element 38 and conventional beam forming and accelerating elements (not shown). By virtue of the potentials applied to the cathode 38 and the metal screen 22 of the storage screen 20, electron gun 34 directs a low velocity electron beam toward the metal screen 22, as shown by the arrow 40; electron beam 40 is scanned in raster fashion over the surface of metal screen 22 by suitable horizontal and vertical deflection coils 42 and 44, it being understood that any conventional deflection system may be employed.

A conventional field electrode 46 is provided in envelope 12 between storage screen 20 and electron gun 34 and is coupled to a suitable potential in order to establish the electron optical system for the electron beam 40, as is well known to those skilled in the art. Field electrode 46 may take the form of a metal screen, as shown, and/or a conductive wall coating on the interior surface of the envelope 12.

Figure 3:
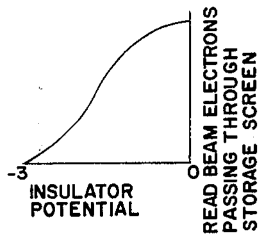
FIG. 3 is a chart showing the transmission of read beam electrons through the storage screen plotted against the potential level of the insulator surface of the storage screen.

Referring particularly to FIG. 2, as electron beam 40 approaches storage screen 20, the beam electrons pass through the screen openings 48 to the collector electrode 26, as shown by the arrow 50, and/or are repelled and reflected rearwardly back toward the electron gun 34, as shown by the arrow 52, depending upon the elemental charge on the dielectric material 24 surrounding the particular screen opening 48. Thus, as shown in the chart of FIG. 3 and with a potential of plus 2 volts applied to the metal screen 22, a potential of −600 volts applied to the photocathode 14, and with the cathode 38 of electron gun 34 being at ground potential, when the potential of the dielectric material 24 is at ground, all of the reading beam electrons will pass through the opening 48, whereas if the potential of the dielectric material 24 is −3 volts, none of the reading beam electrons will pass through the opening 48; if the potential of dielectric material 24 surrounding the particular opening 48 is intermediate −3 volts and ground, a corresponding portion of the reading beam electrons will pass through the opening 48 to the collector electrode 26, and the remainder will be reflected. It is thus seen that both the flow of electrons 50 transmitted through the openings 48 in the storage screen 20 to the collector screen 28 and the electrons 52 reflected from the storage screen are modulated in response to the elemental electrostatic charge on the dielectric material 24.

In order to extract an output signal from one of the modulated transmitted or reflected portions of the reading beam, in the illustrated embodiment, a conventional secondary emission multiplier 54 is provided at the end 36 of the envelope 12 surrounding the electron gun 34. Multiplier 54 comprises a succession of dynodes 56 at progressively higher potentials, and an output dynode or electrode 58 coupled to a suitable source of potential so that the reflected electrons 52 are attracted to the multiplier 54 and result in a current flow in load resistor 60 proportional to the flow of reflected electrons 52. An output circuit 62 is coupled to the output dynode 58 of the multiplier 54 by a suitable coupling capacitor 64.

Figure 4:
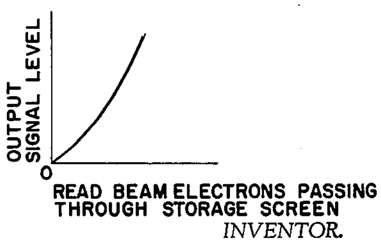
FIG. 4 is a chart showing the output signal plotted against the reading beam transmission through the storage screen.

Reference to FIG. 4 will reveal that in the illustrated embodiment, with no read beam electrons passing through the openings in the storage screen 20, i.e., with all of the reading beam electrons being reflected as at 52, the minimum output signal level is provided, whereas when all of the reading beam electrons pass through the openings in the storage screen as at 50, the maximum output signal level is provided. A 100% modulation of the reading beam is possible under the proper condition. It will thus be seen that with a charge pattern or image developed on the dielectric material 24 of the storage screen 20 responsive to the electron image 28, the elemental charges varying across the area of the storage screen, repetitively scanning the reading beam 40 across the metal screen 22, will result in the development of a time-based output signal in the output circuit 62 responsive to the input optical image 18.

Since the read-out from the storage screen 20 is nondestructive, it will be seen that in order to store and then read-out new information, it is necessary to erase the charged image on the dielectric material 24. This may be accomplished by flooding the entire area of photocathode 14 in any suitable known manner with an input radiation beam at 18 of the proper frequency so that a flood beam of electrons at 28 in place of an image is directed toward the dielectric material 24 thereby to restore an equilibrium potential thereon. A flood beam may be supplied for example, by a small external light source placed at the focal point of a lens to provide a full diameter collimated beam at 18 directed at the photocathode. In the illustrated embodiment, erasure of the charged image on the dielectric material layer 24 by the flood beam is accomplished by impressing a potential on the photocathode only slightly negative with respect to the potential applied to the metal screen 22, as opposed to the highly negative potential which is applied to the photocathode in order to form the charge image. Thus, a suitable switch 66 is provided for selectively coupling the photocathode 14 to source 68 of potential which is highly negative with respect to the potential applied to the metal screen 22 for writing and to source 70 of potential which is only slightly negative with respect to the potential of the metal screen 22 for erasing. It is also desirable that the switch have a third position, not shown, which is connected to zero or ground potential, for the reading operation.

In the illustrated embodiment of the invention, source 68 of highly negative potential may be −600 volts, source 70 may be −5 volts, a potential of +2 volts may be applied to the metal screen 22, potentials of +100 volts may be applied respectively to the collector electrode 26 and the field electrode 46, cathode 38 of electron gun 34 may be connected directly to ground potential, the first dynode 56 of secondary electron multiplier 54 may be at a potential of +300 volts and the output dynode 58 may be at a potential of +1200 volts.

As indicated heretofore, one of the requirements for a storage camera tube is long storage of the charge image; such long storage may be obtained in the storage camera tube of the invention by employing for the dielectric material 24 a good insulator having high secondary emission characteristics, such as magnesium fluoride ($MgF_2$); use of such insulator material having good secondary emission properties and extremely high resistance has been impractical in prior camera tubes employing a continuous insulator film due to their insulating properties. Employment of such high secondary emission materials further increases the magnitude of the stored charge and thus in turn greatly increases the sensitivity of the tube.

It will now be readily seen that in accordance with the invention, a storage camera tube is provided wherein once the image has been stored as an electrostatic charge pattern on a storage screen, a large number of read-outs can be obtained without disturbing the stored image. It will be seen that since, in accordance with the invention, high resistivity dielectrics may be employed for the storage layer thus increasing the storage time, the number of readouts is correspondingly increased, the tube having the capability of reading seconds, minutes or even longer after writing, and further, integration during writing to increase the threshold sensitivity or to improve the signal-to-noise ratio is permitted. Most importantly, in the storage camera tube of the invention, the output signal is essentially independent of scanning speed and thus a slow-scan output with a corresponding reduction in the bandwidth of the output signal may be provided. It will be seen that the tube may be employed as a high-resolution bandwidth compression device. It will further be seen that with the tube of the invention, the reading beam current amplitude and resultant output signal may be adjusted almost at will within the upper limits set by the resolution requirements without erasing the controlling written charge on the dielectric.

While I have described above the principles of my invention in connection with specific apparatus, it is to be clearly understood that this description is made only by way of example and not as a limitation to the scope of my invention.

What is claimed is:

1. A camera tube system comprising: an evacuated envelope having opposite ends; a photocathode at one end of said envelope; a perforate storage screen extending transversely across said envelope intermediate said ends, said screen comprising a fine mesh metal screen and a screen formed of secondary-emissive dielectric material having one side thereof facing said photocathode; a first source of potential coupled to said photocathode and a second source of potential coupled to said metal screen, said first and second potential sources being proportioned so that said photocathode emits an electron image toward said storage screen responsive to impingement of an optical image on said photocathode whereby a charge image is developed on said dielectric material corresponding to said electron image; an electron gun at the other end of said envelope and including a cathode; a third source of potential coupled to said cathode and proportioned so that said electron gun directs a beam of electrons toward the side of said metal screen remote from said dielectric material whereby a part of the electrons of said beam pass through said storage screen and another part of the electrons of said beam are reflected back toward said electron gun responsive to the respective elemental charges on said dielectric material; a secondary emission multiplier at the other end of said tube and a fourth source of potential coupled thereto and proportioned to attract said reflected part of said beam electrons; a secondary-emission collector electrode positioned between said photocathode and storage screen, and a fifth source of potential coupled to said collector electrode and proportioned so that said collector electrode attracts secondary electrons emitted from said dielectric material responsive to impingement of said electron image thereon; an output circuit coupled to said multiplier for providing an output signal responsive to the current flow in said multiplier; means for repetitively scanning said electron beam across said metal screen whereby the flow of said one electron beam part is modulated in response to said charge image thereby developing a time-based signal in said output circuit responsive to said charge image, input radiation means applying a flood beam in place of said optical image to said photocathode, said first source of potential being substantially negative with respect to said second source, and a sixth source of potential which is less negative than said first source with respect to said second source and substantially positive with respect to said first source, and switching means having first and second alternate positions for selectively coupling said photocathode to said first source to permit said charge image to form on said dielectric material and to said sixth source to permit electrons produced by said flood beam on said photocathode to erase said charge image from said dielectric material.

2. A camera tube system comprising: an evacuated envelope having opposite ends; a photocathode at one end of said envelope; a perforate storage screen extending transversely across said envelope intermediate said ends, said screen comprising a fine mesh metal screen having secondary-emissive dielectric material on the one side thereof facing said photocathode; a first source of potential coupled to said photocathode and a second source of potential coupled to said metal screen, said first and second potential sources being proportioned so that said photocathode emits an electron image toward said storage screen responsive to impingement of an optical image on said photocathode, said second potential being near ground and said first potential being substantially negative with respect thereto; a secondary-emission collector electrode between said photocathode and said storage screen; a third source of potential coupled to said collector electrode and proportioned to attract secondary electrons emitted from said dielectric material responsive to impingement of said electron image thereon whereby a charge image is developed on said dielectric material corresponding to said electron image; electromagnetic means for focusing said electron image onto said storage screen; an electron gun at the other end of said envelope and including a cathode; a fourth source of potential coupled to said cathode and proportioned so that said electron gun directs a low velocity beam of electrons toward the other side of said metal screen remote from said dielectric material whereby a part of the electrons of said beam pass through said storage screen and the remainder of said electrons are reflected back toward said electron gun responsive to the respective elemental charge on said dielectric material, said fourth potential being slightly negative with respect to said second potential; a transverse field electrode between said storage screen and said electron gun; a fifth source of potential coupled to said field electrode and proportioned to establish an electron optical system for said electron beam; said third and fifth potentials being substantially positive with respect to said second potential; a secondary emission multiplier at said other end of said envelope; a sixth source of potential coupled to said multiplier and proportioned so that said multiplier attracts said reflected electrons; said sixth potential being substantially positive with respect to said fifth potential; a seventh source of potential which is less negative than said first source with respect to said second source and substantially positive with respect to said first source; an output circuit coupled to said multiplier for providing signal responsive to the current flow in said electrode; means for repetitively scanning said electron beam across said metal screen whereby the flow of said reflected electrons is modulated in response to said charge image thereby developing a time-based signal in said output circuit responsive to said charge image; input radiation means applying a flood beam in place of said optical image to said photocathode; and switching means having first and second alternate positions for selectively coupling said photocathode to said first source to permit said charge image to form on said dielectric material and to said seventh source to permit electrons produced by said flood beam on said photocathode to erase said charge image.

References Cited by the Examiner

UNITED STATES PATENTS

| | | | |
|---|---|---|---|
| 2,300,591 | 11/1942 | Osawa | 315—10 |
| 2,322,807 | 6/1943 | Iams | 315—10 |
| 2,667,596 | 1/1954 | Szegho et al. | 315—11 |
| 2,747,133 | 5/1956 | Weimer | 315—11 |
| 2,755,408 | 7/1956 | Theile | 315—11 |
| 2,826,714 | 3/1958 | Forgue | 315—12 |
| 2,869,025 | 1/1959 | Hergenrother | 315—11 |

DAVID G. REDINBAUGH, *Primary Examiner.*

J. A. O'BRIEN, J. E. BECK, T. A. GALLAGHER, *Assistant Examiners.*